United States Patent
Shih et al.

(10) Patent No.: US 11,800,310 B2
(45) Date of Patent: Oct. 24, 2023

(54) SOUNDBAR AND METHOD FOR AUTOMATIC SURROUND PAIRING AND CALIBRATION

(71) Applicant: HARMAN INTERNATIONAL INDUSTRIES, INCORPORATED, Stamford, CT (US)

(72) Inventors: Shao-Fu Shih, Mountain View, CA (US); Jianwen Zheng, Guangdong (CN); Yi Xiao, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/843,166

(22) Filed: Jun. 17, 2022

(65) Prior Publication Data
US 2022/0408210 A1 Dec. 22, 2022

(30) Foreign Application Priority Data
Jun. 18, 2021 (CN) .......................... 202110678078.9

(51) Int. Cl.
*H04S 7/00* (2006.01)
*G06F 3/16* (2006.01)
*H04N 21/436* (2011.01)

(52) U.S. Cl.
CPC .............. *H04S 7/301* (2013.01); *G06F 3/165* (2013.01); *H04N 21/43615* (2013.01)

(58) Field of Classification Search
CPC . H04S 7/301; H04S 7/40; H04S 7/308; H04S 7/00; G06F 3/165; G06F 3/16;
(Continued)

(56) References Cited

U.S. PATENT DOCUMENTS

2007/0237340 A1* 10/2007 Pfanzagl-Cardone ....................... H04R 1/406
381/91
2015/0016642 A1* 1/2015 Walsh ..................... H04S 7/301
381/307
(Continued)

FOREIGN PATENT DOCUMENTS

EP 3182734 B1 8/2018

OTHER PUBLICATIONS

Partial European Search Report dated Nov. 9, 2022 for European Application No. 22178890.4, 12 pgs.

*Primary Examiner* — Yosef K Laekemariam
(74) *Attorney, Agent, or Firm* — Brooks Kushman P.C.

(57) ABSTRACT

The disclosure relates to a soundbar and a method for automatic surround pairing and calibration of a surround sound system. The soundbar includes two built-in microphones on the left and right respectively, which can be used for determining relative positions of left and right surround speakers. When the relative positions of the left and right speakers are not correct, configurations of left and right surround channels can be automatically swapped with each other without manually swapping physical positions of the surround speakers by a user. In addition, latencies including a latency of each channel of a main system may also be calibrated, and magnitude compensation may be achieved by calculating a filter compensation coefficient of each line and merging it into an original filter. The automatic surround pairing and calibration of the surround sound system may be one-click completed automatically by the user by pressing a start button.

30 Claims, 5 Drawing Sheets

(58) Field of Classification Search
CPC ........... H04N 21/43615; H04N 21/436; H04R 29/001; H04R 3/005
USPC .................................................. 381/18, 307
See application file for complete search history.

(56) References Cited

U.S. PATENT DOCUMENTS

2017/0257722 A1   9/2017   Kerdranvat et al.
2019/0394599 A1   12/2019  Shi et al.

* cited by examiner

SOUNDBAR AND METHOD FOR AUTOMATIC SURROUND PAIRING AND CALIBRATION

CROSS-REFERENCE TO RELATED APPLICATIONS

This application claims priority to CN application Serial No. 202110678078.9 filed Jun. 18, 2021, the disclosure of which is hereby incorporated in its entirety by reference herein.

TECHNICAL FIELD

The disclosure generally relates to automatic surround pairing and calibration. More particularly, the disclosure relates to a method for automatic surround pairing and calibration using dual-microphone beam forming in a surround sound system.

BACKGROUND

Home theater systems with surround sound effects are becoming more popular as one of modern integrated home entertainment system options. One of the most common configurations of a home theater surround sound system includes a main speaker, a surround speaker pair, and some also include a subwoofer, such as a 5.1-channel system. For convenience of users and tidiness of rooms, the surround speakers may transmit audio signals using a wireless solution. In this case, no external wiring is required to be connected to the main speaker. While reducing unnecessary wiring, an additional wireless speaker pairing process will be needed during the setup. To compensate for acoustic differences in different rooms and layouts, most all-in-one systems provide acoustic calibration for the system. This calibration is first measured in situ by pairing between the speakers and microphones, then magnitude compensation is performed according to a target profile, and the system compensates for a distance of each speaker in the arrangement by aligning a latency of each speaker pair, correspondingly.

The existing solution generally includes two steps. First, the user needs to pair and correct an assignment of the surround speakers. Secondly, the user may then calibrate their latencies and frequency response. Some calibration methods require at least one external microphone to measure sound at a desired position and transmit the sound back to the system to learn acoustic performance of a listening area. However, these methods cannot perform automatic speaker assignment correction. In this case, the user reverses left and right surround speakers, sound and images perceived by the user will be reversed. Some calibration methods require a user to manually pair and reassign the surround speakers, and the user needs to personally listen to which speaker the test tone comes from and select which speaker is playing. During installation of the surround sound system, the surround sound system may provide inconvenience for the user to reassign surround channels and calibrate the surround sound system, which has been a driving force behind the need to design an all-in-one solution that automatically handles the surround pairing and calibration.

SUMMARY

The disclosure provides a soundbar for automatic surround pairing and calibration of a surround sound system. The soundbar integrates a front speaker of the surround sound system, which includes a center speaker, a left speaker and a right speaker. A left and a right built-in microphones are also integrated into the soundbar. The two built-in microphones are respectively fixed to the left and right sides of the center speaker and are quite close to the center speaker. The soundbar also includes a processor for obtaining a listening position of a user. The listening position being defined as an appropriate distance in front of the soundbar. Relative positions of the left and right surround speakers may be determined through the left and right built-in microphones. When it is determined that the relative positions of the left and right speakers are not correct, assignments of left and right surround channels may be automatically swapped. The processor may also be configured to calibrate a distance latency of each channel, such as a center channel, a left surround channel, and a right surround channel, by measuring a distance between speakers and a distance from each speaker to the listening position. The processor may process the left channel and right channels correspondingly, then, calculate filter compensating coefficients and respectively merge the coefficients into the left and right surround channels for compensating magnitudes of the left and right surround channels.

The disclosure further provides a method for automatic surround pairing and calibration of a surround sound system. In an arrangement of a surround sound system, the method includes determining relative positions of the left and right surround speakers through left and right two built-in microphones integrated in the soundbar. The two built-in microphones are respectively fixed to the left and right sides of a center speaker of the surround sound system may be close to the center speaker. The method further includes obtaining, by a processor, a listening position of the surround sound system at an appropriate distance in front of the soundbar, measuring a distance between speakers and from each speaker to the listening position to calibrate distance latencies of channels (e.g., a center channel and corresponding left and right channels, and left and right surround channels), calculating filter compensating coefficients and merging them into the left and right surround channels respectively, to compensate magnitudes of the left and right surround channels.

The disclosure also provides a non-transitory computer-readable medium including instructions that, when executed by a processor, implement the foregoing method for automatic surround sound pairing and calibration. The processing for automatic surround pairing and calibration of the surround sound system in the disclosure may be automatically one-click completed by a user by pressing a button.

BRIEF DESCRIPTION OF THE DRAWINGS

These and/or other features, aspects and advantages of the present invention will be better understood after reading the following detailed description with reference to the accompanying drawings, throughout which same characters represent corresponding parts.

DETAILED DESCRIPTION

Detailed descriptions of embodiments of the present invention are as follow. However, it should be understood that the disclosed embodiments are merely examples that may be embodied in various and alternative forms. The figures are not necessarily drawn to scale. Some features may be exaggerated or minimized to show details of particular components. Therefore, specific structural and functional details disclosed herein are not to be interpreted as limiting, but merely as a representative basis for teaching a person skilled in the art to implement the disclosure in various ways.

It is well known to those skilled in the art that sound waves propagate in the form of sine waves. During such a transmission process, when sounds from a plurality of speakers or sound sources arrive at a listening position at different times, sounds heard by the human ear have differences in time and intensity. This condition may result in sound smearing. In addition, a difference between positive and negative phases of a sound wave may cancel energy from each other, which will also cause a drop of sound pressure. Therefore, during installation of a surround sound system, a user needs to pair and assign surround sound speakers and calibrate the system.

However, there is a potential need for the user to confirm a pairing process and swap the surround speakers before individually tuning the entire system This may be inconvenient. The disclosure provides, among other things, a soundbar and method for automatic surround pairing and calibration to combine pairing and tuning into a single process that can be one-click triggered by pressing a button. This can be achieved by, through a processor in a system-on-chip (SoC), controlling two built-in microphones and determining latencies in the surround sound system.

For example, for a sound amplification device in a home theater, it is a common configuration to achieve surround sound with five channels consisting of five speakers, and this configuration may achieve an effect close to that of a theater. In an example of a 5.1-surround sound configuration, except for a subwoofer, which is not discussed here, the five speakers are respectively a left channel speaker, a right channel speaker, a center speaker, a left surround speaker, and a right surround speaker. The left channel speaker, the center speaker and the right channel speaker are called front speakers that reproduce the main content of sound to audiences. A left surround channel and a right surround channel are played through the left and right surround speakers to produce a surround sound effect to bring a user an immersive listening experience.

Figure 1:
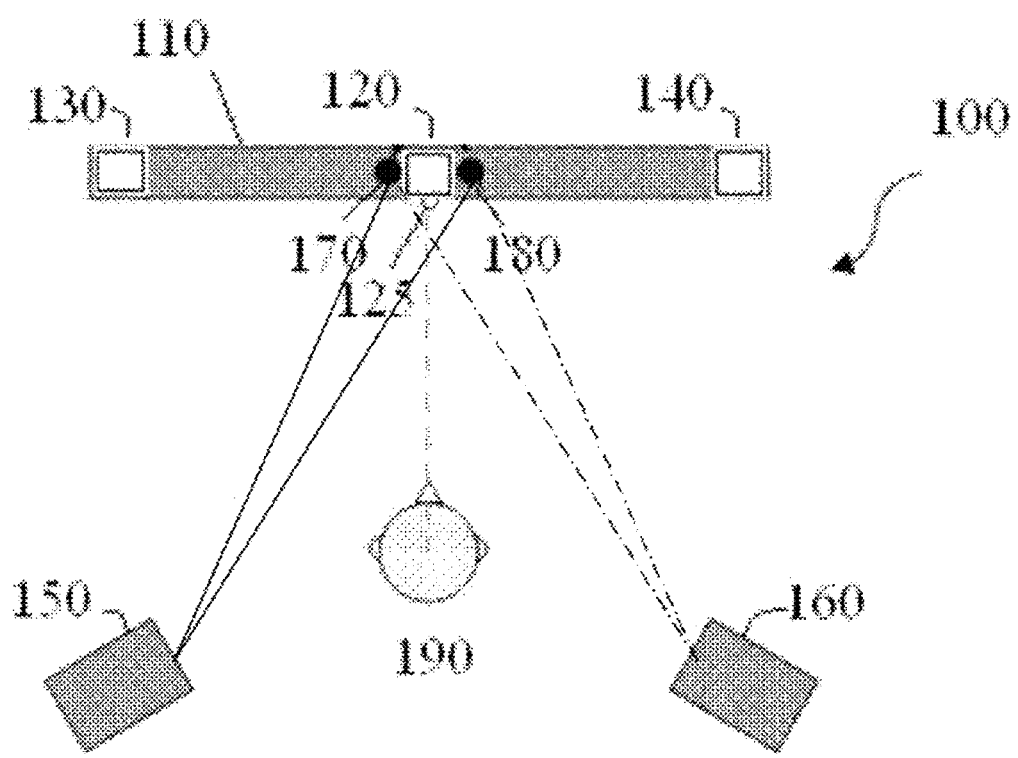
FIG. 1 shows an arrangement of an example surround sound system, including a soundbar with left and right built-in microphones for automatic surround pairing and calibration, and left and right surround speakers, according to one or more embodiments of the disclosure.

FIG. 1 shows example surround sound system 100 arranged for listening position 190. This example may be a 5.1-channel surround sound system (a subwoofer is not shown). In this example, a front speaker system including center speaker 120, left speaker 130, and right speaker 140 form a sound bar 110. Center speaker 120 is arranged in the middle of soundbar 100 and left speaker 130 and right speaker 140 are respectively arranged at a fixed distance from center speaker 120 on the left and right sides, so that relative positions of the three front speakers is fixed. Listening position 190 is disposed in front of soundbar 110 in a conventional arrangement and is located near a midperpendicular of the listening position 190. The soundbar 110 may be generally arranged below a television (not shown), so that a listener at listening position 190 may face the television and the sound bar 110 while keeping a proper distance from them. Other two surround speakers, i.e., left surround speaker 150 and right surround speaker 160 are physically arranged somewhere to the left and right sides of the listening position 190 respectively. Thus, in a configuration of surround sound system 100 in this example, the center channel plays audio content to listening position 190 through center speaker 120, the left and right channels are respectively played through left and right speakers 130 and 140, and the left and right surround channels are respectively played through left and right surround speakers 150 and 160. In this arrangement, as the relative positions of left and right speakers 130 and 140 and center speaker 120 are fixed, the pairing and calibration of left and right speakers 130 and 140 is simple, the main concern may therefore be the pairing and calibration between the center speaker 120 and the surround speakers 150 and 160. However, those skilled in the art can understand that left speaker 130 and right speaker 140 and center speaker 120 are fixedly integrated in the soundbar, so that the left channel on left speaker 130, and the right channel on right speaker 140 may be subjected the same calibration processing as the center channel. Therefore, when the center channel is processed during calibration, the left and right channels may also be processed in the same way, that is, the left and right channels are also calibrated at the same time.

In addition, two microphones 170 and 180 for automatic surround sound calibration are also integrated in the front speaker system and are respectively fixed to the left and right sides of center speaker 120 and close to center speaker 120. As shown in the example of FIG. 1, two built-in microphones 170 and 180 may be installed inside the soundbar 110, fixed to the left and right sides close to center speaker 120, and close to center channel 125 in center speaker 120. The left and right built-in microphones 170 and 180 may be particularly used for automatic pairing and calibration of the speakers in surround sound system 100 in a setting-up process of the surround sound system. It should be noted that the 5.1-channel surround sound system mentioned in the disclosure is just an example. It is conceivable for those skilled in the art that the disclosure is not limited to a 5-channel surround sound system with a pair of surround speakers, but is applicable to any pair of speakers which can be assigned freely, for example, but is not limited to, a 7.1-channel system with two pairs of surround speakers (left and right surround speakers, and left and right back surround speakers), a 9.1-channel system with three pairs of surround speakers, and so on.

Figure 2:
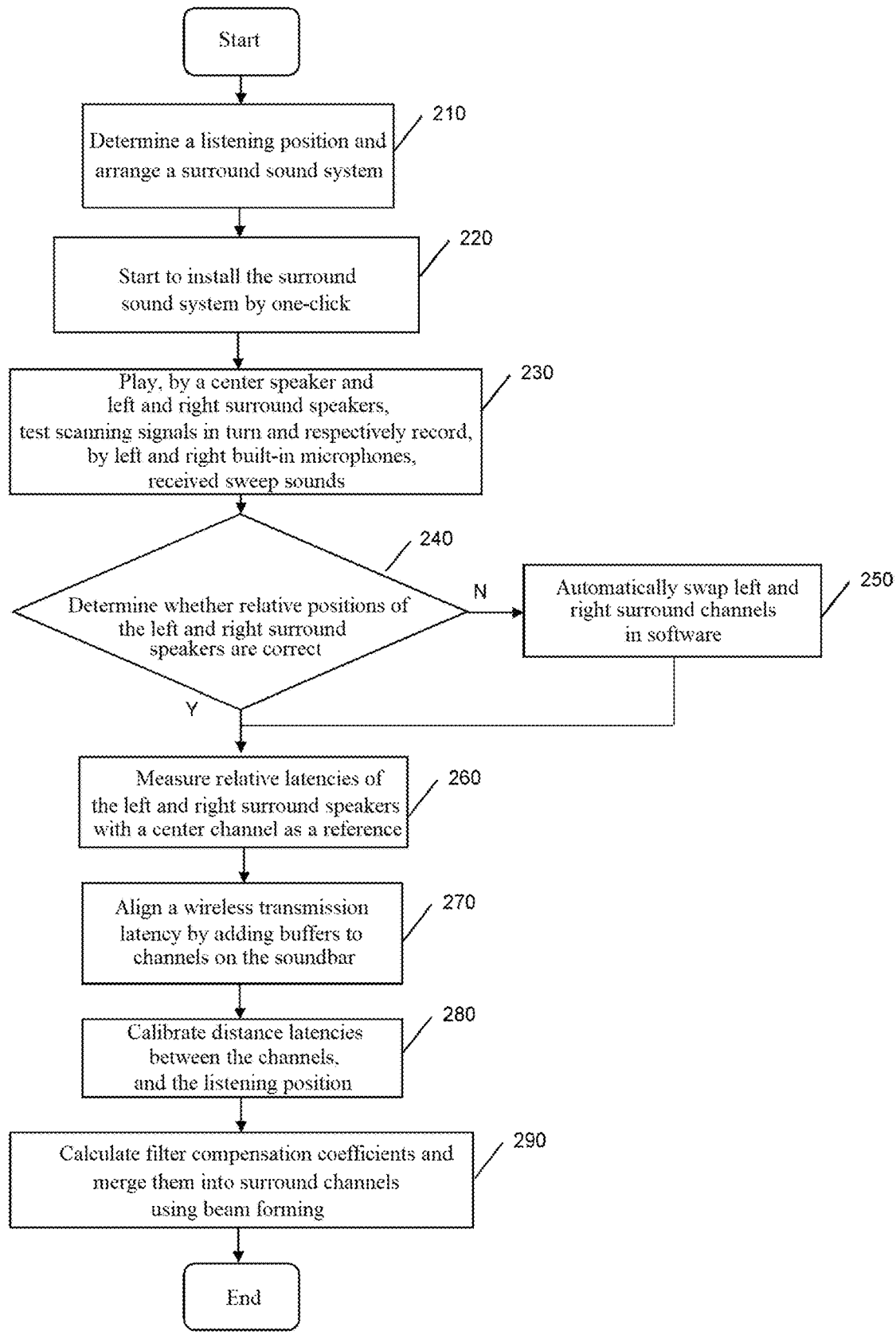
FIG. 2 shows an example flow chart of a method for automatic surround pairing and calibration of the surround sound system in FIG. 1 according to one or more embodiments of the disclosure.

FIG. 2 shows an example flow chart of a method for automatic surround pairing and calibration of the surround sound system in FIG. 1. Starting from arranging the surround sound system, in step 210, a user may arrange a home theater system based on a listening position preset in a listening area such as a living room. The user may place a soundbar and two surround speakers according to the exemplary layout recommended in FIG. 1. The soundbar with a center speaker and left and right speakers built in may be arranged at a certain distance in front of the listening position, and the surround speakers may be freely placed anywhere on either side of the listening position, which depends of course on the area and decoration of the living room. It is conceivable that sound calibration is required before a surround sound system such a surround sound system as used in a home theater is put into service. The surround sound system may also need periodic calibration in daily use, for example, after long-term use, or after the surround sound speakers are moved, the surround sound system may need to be paired and calibrated again to maintain a good sound effect.

Figure 3A:
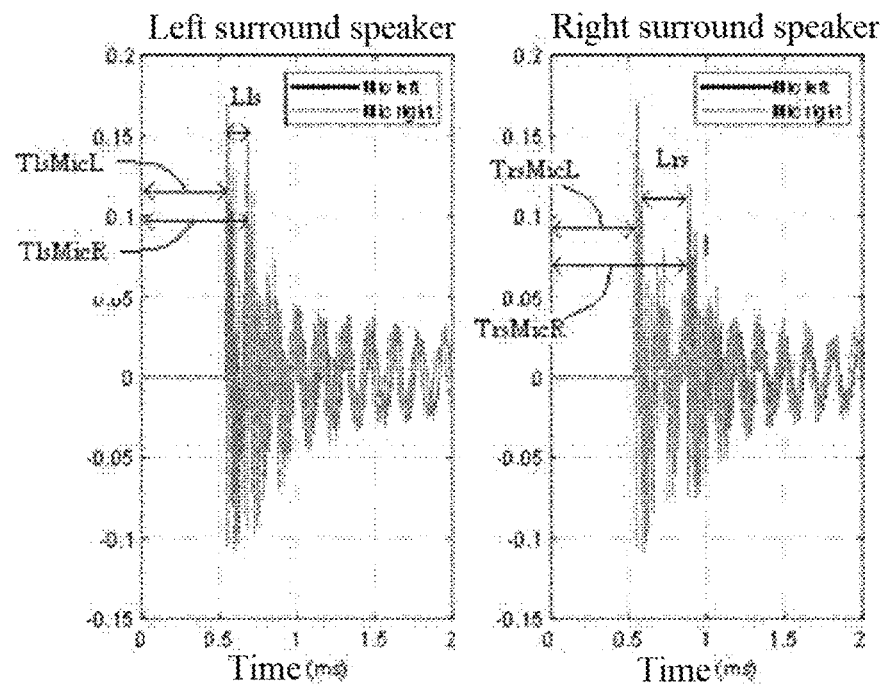
FIG. 3a depicts an exemplary graphical impulse response recorded by two built-in microphones when relative positions of left and right surround speakers are correct.

In step 220, after the user presses a button, for example, a button set on a remote controller, to trigger a setting-up process, the center speaker and the left and right surround speakers start to play the frequency sweep test signal in turn respectively. The left and right built-in microphones in the soundbar respectively record sweep sounds from the two surround speakers and the center speaker in step 230. Therefore, the differential time between the received sweep sounds from the left surround speaker and the right surround speaker may be tested through sample conversion by examining signal correlation or impulse response latency, respectively. In this case, the differential time may be defined as propagation time of the sweep sound from a specific surround speaker to the left microphone minus propagation time from the speaker to the right microphone. As shown by solid and dot-dash lines in FIG. 1, a difference in propagation times of two solid line paths represents the differential time between propagation time from the left surround speaker to the left built-in microphone and propagation time from the left surround speaker to the right built-in microphone; a difference in propagation times of two dot-dash line paths represents the differential time between propagation time from the right surround speaker to the left built-in microphone and propagation time from the right surround speaker to the right built-in microphone. The tested differential time may be used to check in step 240 whether the arrangement of the relative positions of the left and right surround speakers are correct. If the differential time of the left surround speaker is smaller than the differential time of the right surround speaker, it is determined that they are in the correct relative position; if the differential time of the left surround speaker is greater than that of the right surround speaker, it is determined that their relative position is incorrect. For example, left and right graphs in FIG. 3*a* depict impulse response recordings of the left and right built-in microphones, where a dark line (Mic left) represents an impulse response recorded by the left microphone from a particular surround speaker, and a light line (Mic right) represents an impulse response recorded by the right microphone from this surround speaker. The left graph in FIG. 3*a* also shows the propagation times $T_{ls\_MicL}$ and $T_{ls\_MicR}$ from the left surround speaker to the left and right built-in microphones, respectively. It can be seen that the differential time between two recording signals is received by the left and right built-in microphones from the left surround speaker, which is shown as a difference between the two propagation times, and is denoted as $L_{ls}$. Similarly, the right graph in FIG. 3*a* shows the propagation times $T_{rs\_micL}$ and $T_{rs\_micR}$ from the right surround speaker to the left and right built-in microphones, and the differential time between two signal recordings received by the left and right built-in microphones from the right surround speaker, respectively, which is denoted as $L_{rs}$. Comparing left and right, two sets of curves in FIG. 3*a*, the differential time from the left surround speaker to the microphones is significantly smaller than the differential time from the right surround speaker, that is, $L_{ls}<L_{rs}$, and then, it is determined that the relative positions of the left surround speaker and the right surround speaker is correct.

Figure 3B:
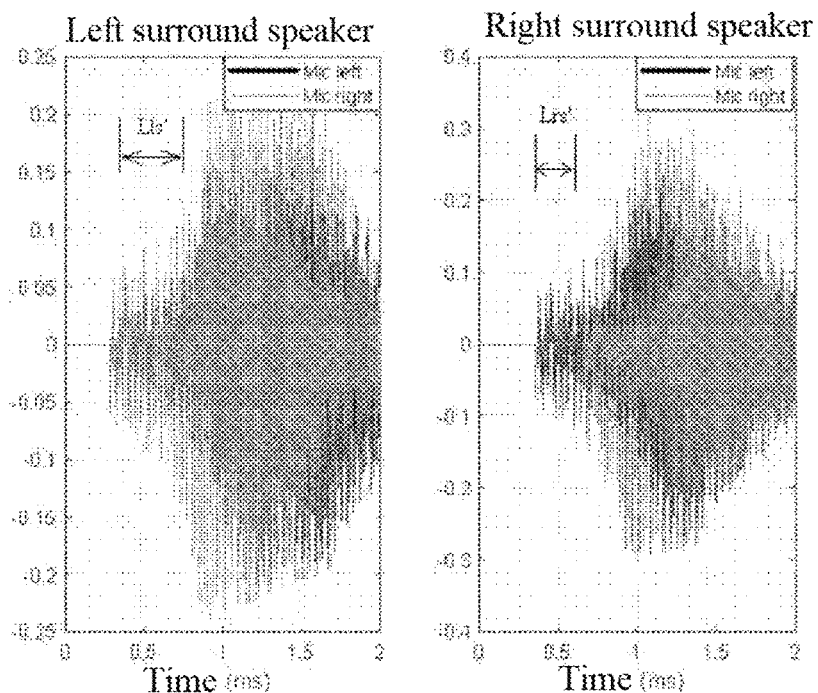
FIG. 3b depicts an exemplary graphical impulse response recorded by two built-in microphones when relative positions of left and right surround speakers are incorrect.

Relatively speaking, two sets of curves shown in FIG. 3*b* respectively correspond to the two sets of curves in FIG. 3*a*. However, by comparing the differential time from the left and right surround speakers recorded by the left and right two built-in microphones, as shown in FIG. 3*b*, the differential time $L_{ls'}$ from the left surround speaker is greater than the differential time $L_{rs'}$ from the right surround speaker, that is, $L_{ls'}<L_{rs'}$, and accordingly, the relative positions of the left and right surround speakers are incorrectly reversed. In this case, as shown in step 250 in FIG. 2, the relative positions of the left and right surround speakers may be corrected in software, including automatically swapping the left and right surround channels on the left and right surround speakers, respectively. In one example in the automatic speaker assignment and correction provided in the disclosure, the user does not need to manually change physical positions of the speakers, and the left and right surround channels may be automatically swapped through software after algorithm calculation, for example, but is not limited to, left and right surround sound channel resources such as identifiers, locations, and playback content may be swapped and reassigned. With the automatic speaker assignment, pairing and assignment of the surround speakers and subsequent calibration of latencies and frequency responses in the system during setting-up of the surround sound system may be completed by one click.

Latency instability is a common problem of the surround sound system. Due to the problem of latencies, a measured impulse response in each calibration may be inaccurate. In this case, referring back to FIG. 1, since two built-in microphones 170 and 180 are quite close to center speaker 120, center channel 125 built in center speaker 120, which is also playing a test scanning signal, may be used as a latency reference. A surround relative latency may be defined here as propagation time from a particular surround speaker to the left and right built-in microphones minus propagation time from the center speaker to the left and right built-in microphones. As mentioned above when describing step 230 in FIG. 2, the center speaker and the left and right surround speakers play their respective sweep test signals in turn, and the left and right built-in microphones inside the soundbar respectively record sweep sound from each speaker (for example, the left and right surround speakers and the center speaker). Therefore, in step 260 in FIG. 2, the relative latencies of the left and right surround speakers may be accurately measured with the center channel as a reference, and then calibration may be performed. For example, a left surround relative latency $L_{ls\_c}$ from the left surround speaker is defined as:

$$L_{ls\_c}=t_{ls}-t_c \qquad (1)$$

where $t_{ls}$ and $t_c$ are respectively the propagation time from left surround channel to the microphones and the propagation time from the center channel to the microphones. As can be understood by those skilled in the art, the above-mentioned propagation times for respectively reaching the left and right built-in microphones have been subjected to, for example, weighted average processing.

Similarly, a right surround relative latency $L_{rs\_c}$ is defined as:

$$L_{rs\_c} = t_{rs} - t_c \quad (2)$$

where $t_{rs}$ is the propagation time from the right surround channel to the microphone, which is also subjected to, for example, weighted average processing, for the left and right built-in microphones. After the relative latencies of the surround sounds of the left and right surround speakers are accurately calculated with reference to the center channel, the paired surround speakers may be calibrated.

As mentioned above, since both built-in microphones are close to the center speaker, $t_c$ is much smaller than both $t_{ls}$ and $t_{rs}$, but this does not entail that $t_c$ is absolutely small. On the SoC, since software runs on, for example, an embedded system platform, many software-related latencies also required to be taken into account. Moreover, these latencies in the system may be unstable, that is, after each boot, $t_c$, $t_{ls}$, and $t_{rs}$ may have the same latency fluctuation deviation. At this point, $t_c$ may be used as a reference value including a random deviation of each boot. Subtracting $t_c$ from $t_{ls}$ and $t_{rs}$ may just remove this fluctuation deviation.

Furthermore, it is also required to consider a wireless transmission latency in the calibration, and add a buffer latency to each channel of the soundbar to achieve synchronization, based on performance of the SoC. The wireless transmission latency here is fixed and may only be related to specifications of wireless chip models. That is, when it is necessary to add a buffer latency to compensate the wireless transmission latency on the soundbar, latencies of all channels on the soundbar are required to be aligned and synchronized first. For example, if the system has two wireless surround speakers, the system needs to compensate for channels of the two surround speakers first, and then calculate other latencies. Therefore, in step 270, the wireless transmission latency may be aligned by adding a buffer latency to each channel of the soundbar.

On the one hand, the distances from the center speaker and the surround speakers to the listening position may different, and accordingly, the sound from each speaker may reach the listener's ears at a different time. In order to ensure that the sound restored between different speakers may reach the listener's ears almost perfectly, and also to ensure that the sound and image of the home theater system may match each other, it is necessary to calibrate sound signals of some specific channels. Therefore, by adjusting these distance latencies, a sound effect perceived by a listener may be improved to some extent.

Figure 4A:
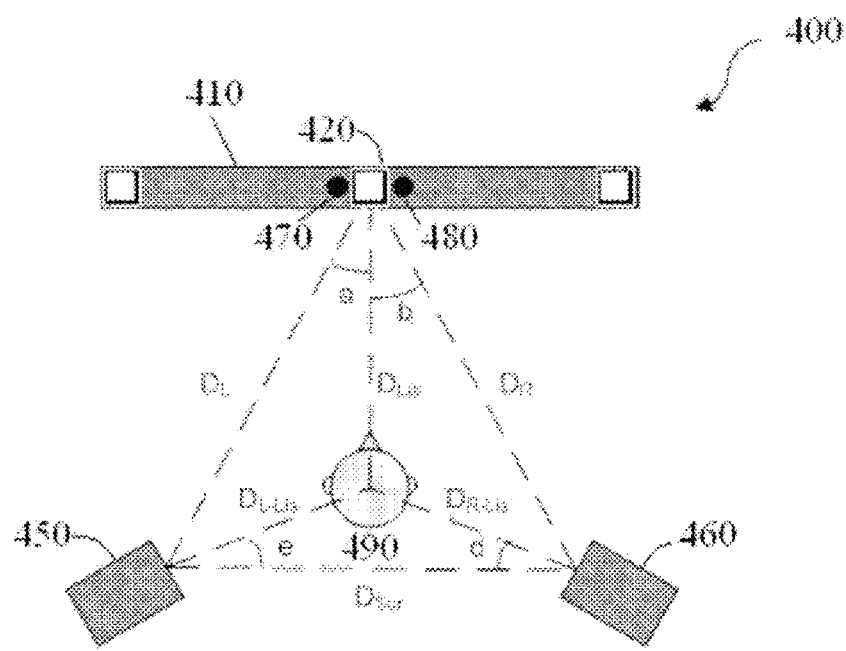
FIGS. 4a to 4b show an example of calculating a relative distance between speakers in a surround sound system and a distance and angle from a speaker to a listening position according to one or more embodiments of the disclosure.

As is known, a latency may be expressed in two forms: distance or propagation time. The two forms may be converted each other by substituting the sound speed c. The sound speed c propagating in air is approximately a constant, which is about c=340 m/s. In an example of surround sound system 400 as shown in FIG. 4a, listening position 490 may be defined by a distance $D_{Lis}$ from a listening position of a listener using surround sound system 400 to soundbar 410. Listening position 490 may, for example, be estimated by a user or preset and input into software, or, for example, a speaker may be placed in the listening position to play a test signal, and then the distance $D_{Lis}$ is measured through built-in microphones. For the sake of brevity, many other known ways of configuring the listening position to the system will not be repeated here.

Figure 4B:
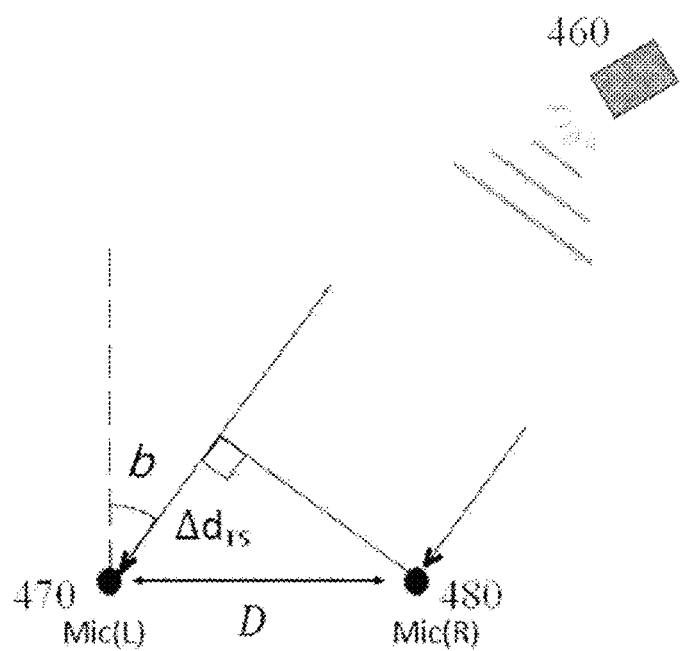

In FIG. 4b, right surround speaker 460 to left and right microphones 470 and 480 in FIG. 4a are taken as an example to continue to describe calibration calculation of the distance latency. As shown in FIGS. 4a and 4b, during calibration, angles a and b, and distances $D_L$, and $D_R$, may be measured and calculated as follows:

$$D_L = c \times L_{ls\_c} \quad (3)$$

$$D_R = c \times L_{rs\_c} \quad (4)$$

$$b = \sin^{-1} \frac{\Delta d_{rs}}{D} \quad (5)$$

$$a = \sin^{-1} \frac{\Delta d_{ls}}{D} \quad (6)$$

where $D_L$, and $D_R$ are respectively the distances from left and right surround speakers 450 and 460 to center speaker 420; a and b are respectively included angles between a connection line between left and right surround speakers 450 and 460 and the soundbar and a midperpendicular of the soundbar (assuming that the listening position is on the midperpendicular). $\Delta d_{ls}$ and $\Delta d_{rs}$ respectively correspond to a distance difference from the left surround speaker to the left and right built-in microphones Mic(L) and Mic(R) and a distance difference from right surround speaker 460 to the two built-in microphones Mic(L) and Mic(R), that is, $\Delta d_{ls} = L_{ls}*c$, $\Delta d_{rs} = L_{rs}*c$, and D is the distance between the left and right built-in microphones. Then the distances $D_{sur}$, $D_{L-Lis}$ and $D_{R-Lis}$, may be deduced on the basis of trigonometric formulas, and thus, estimation of the distance between the speakers will be facilitated, for example:

$$D_{L\_Lis}^2 = D_L^2 + D_{Lis}^2 - 2D_L D_{Lis} \cos(a) \quad (7)$$

$$D_{R\_Lis}^2 = D_R^2 + D_{Lis}^2 - 2D_R D_{Lis} \cos(b) \quad (8)$$

$$S_{Sur}^2 = D_L^2 + D_R^2 - 2D_L D_R \cos(a+b) \quad (9)$$

where $D_{L-Lis}$ and $D_{R-Lis}$ are respectively distances from the left and right surround speakers to the listening position, and $D_{sur}$ is the distance between the left and right surround speakers. Therefore, angles e and d as shown in FIG. 4a may also be calculated. In step 280 in FIG. 2, after the distances between the speakers in the surround sound system are obtained, latencies of all channels in the system may be automatically compensated. For example, a distance latency of the center channel played by the center speaker may be based on the distance $D_{Lis}$ from the center speaker to the listening position, while the left and right surround channels played on the left and right surround speakers may be respectively based on the distance $D_{L-Lis}$, and $D_{R-Lis}$ from the left and right surround speakers to the listening position, so as to adjust the distance latency. Those skilled in the art can understand that the left and right speakers and the center speaker are all arranged in the soundbar, the relative positions of the left and right speakers and distances between the left and right speakers and the center speaker are fixed, so that the left and right channels played on the left and right speakers may be subjected to the same (or sometimes corresponding) calibration processing as the center channel.

On the other hand, propagation of sound in the air may also cause changes in the sound pressure level. For example, it is known that the sound pressure level decreases by 6 dB when a sound amplification distance is doubled. In the surround sound system of the disclosure, a sound field may be amplified with a high-order long-tap filter using a beam forming technology. In this example, the advantage of using the beam forming in a line is that magnitude calibration may be performed based on an impulse response $h_{ls}$ of the left surround speaker, a measured impulse response $h_{rs}$ of the right surround speaker, and a target impulse response $h_{target}$ (where the left and right built-in microphones have been averaged by them). The target impulse response $h_{target}$ may be obtained in a product development stage, for example, the target impulse response be obtained through mathematical formulas by playing a sweep signal directly on a speaker through a test device and recording with the test signal with a test microphone. For example, through correlation calculation between a signal received by the microphone and a positive signal of the sweep signal, the desired target impulse response $h_{target}$ may be obtained. Therefore, in this example, the left surround sound frequency response $FR_{ls}$, the right surround sound frequency response $FR_{rs}$ and the target frequency response $FR_{target}$ may be respectively calculated as follows:

$$FR_{ls} = |FFT(h_{ls})| \quad (10)$$

$$FR_{rs} = |FFT(h_{rs})| \quad (11)$$

$$FR_{target} = |FFT(h_{target})| \quad (12)$$

where FFT represents Fast Fourier Transform and |*| represents the absolute value operation, by which a magnitude value can be obtained. Then the filter coefficient after compensation is:

$$filter_{ls} = iFFT(FFT(filter_{BF}) * FR_{target}/FR_{ls}) \quad (13)$$

$$filter_{rs} = iFFT(FFT(filter_{BF}) * FR_{target}/FR_{rs}) \quad (14)$$

where $filter_{BF}$ represents an original beam forming filter and iFFT represents inverse fast Fourier transform.

Figure 5:
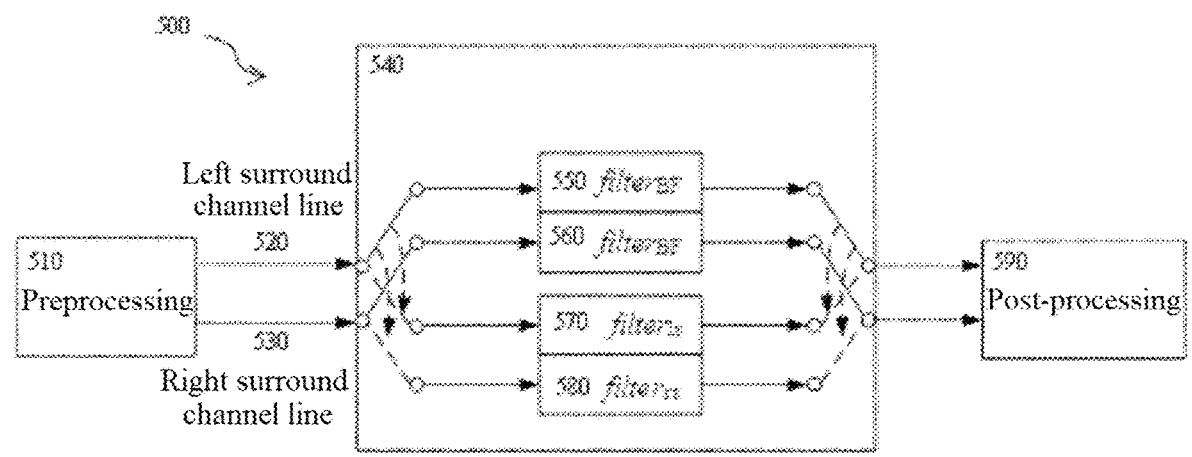
FIG. 5 shows an example model of magnitude calibration processing by merging filter compensation coefficients into left and right surround channels according to one or more embodiments of the disclosure.

FIG. 5 illustrates model 500 of magnitude calibration processing by merging the calculated filter compensation coefficients into the original beam forming filter. This magnitude calibration processing, for example, performs magnitude compensation on different frequencies of the system, but still reuses the original beam filter, thus saving system resources. This processing may compensate for a frequency response in sound propagation, which is also as described in step 290 in FIG. 2. As shown in FIG. 5, original beam forming filters 550 and 560 (both using $filter_{BF}$) used in lines 520 and 530 of the left and right surround channels are merged with the left and right filter compensation coefficients $filter_{ls}$, $filter_{rs}$ calculated by 540 after the magnitude calibration processing so as to form new lines 570 and 580. A block diagram shown in FIG. 5 also includes preprocessing 510 before frequency response compensation and post-processing 590 after frequency response compensation. The aforementioned alignment of the wireless transmission latency by adding buffer latency may be performed in preprocessing 510, and the distance latency calibration may be processed in preprocessing 510 or in post-processing 590. That is, the steps in the flow chart shown with reference to FIG. 2 are not necessarily performed in the order shown in the figure, for example, step 280 and step 290 may also be interchanged.

The soundbar and the method for automatic pairing and calibration of a surround sound system provided in the disclosure can perform automatic pairing and calibration through dual microphones in a device. This system may co-exist with existing voice-enabled product lines and is easier to deploy due to its line optimization. This is implemented by (1) determining the relative positions of the channels, (2) correcting the latency of each channel (including the main system), and (3) performing magnitude calibration based on the predicted listening position.

Any combination of one or more computer-readable media may be used to perform the method provided in the disclosure. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any suitable combination of the foregoing. More specific examples (non-exhaustive list) of the computer-readable storage medium may include, for example: an electrical connection with one or more wires, portable computer floppy disks, hard disks, random access memory (RAM), read-read-only memory (ROM), erasable programmable read only memory (EPROM or flash memory), optical fibers, portable compact disc read only memory (CD-ROM), optical storage devices, magnetic storage devices, or any suitable combinations of the foregoing. In the context of the disclosure, the computer-readable storage medium may be any tangible medium that can include or store a program for use by or in connection with an instruction execution system, apparatus, or device.

As used in the disclosure, an element or step listed in the singular form and preceded by the word "one/a" should be understood as not excluding a plurality of said elements or steps, unless such exception is specifically stated. Furthermore, references to "embodiments" or "examples" of the disclosure are not intended to be construed as exclusive, also including the existence of other embodiments of the recited features. The terms "first", "second", "third", etc. are used only for identification and are not intended to emphasize a numerical requirement or positioning order of their objects.

References in the disclosure to automatic surround pairing and calibration for the surround sound systems include the following content:

Item 1: In one or more embodiments, the disclosure provides a soundbar for automatic surround pairing and calibration of a surround sound system, which includes, but is not limited to, items listed below:

left and right built-in microphones for determining relative positions of left and right surround speakers;

a processor configured to:

obtain from a user a listening position being at a first distance in front of the soundbar;

calibrate distance latencies of a center channel and left and right surround channels; and calculate filter compensating coefficients and merge them into the left and right surround channels, respectively, for compensating magnitudes, where the left and right built-in microphones are integrated in the soundbar, fixed on both left and right sides near a center speaker.

Item 2: According to the soundbar of item 1, the processor is further configured to automatically swap the left and right surround channels with each other in software when the relative positions of the left and right surround speakers are determined to be incorrect.

Item 3: According to the soundbar of items 1 to 2, the relative positions of the left and right surround speakers are determined to be incorrect when the differential time of sweep sound from the left surround speaker to the left and right built-in microphones is greater than that from the right surround speaker to the left and right built-in microphones.

Item 4: According to the soundbar of item 1 to 3, the differential time of the sweep sound from the left surround speaker to the left and right built-in microphones is defined as propagation time of the sweep sound from the left surround speaker to left built-in microphone minus propagation time from the left surround speaker to right built-in microphone, and the differential time of the sweep sound from the right surround speaker to the left and right built-in microphones is defined as propagation time from the right surround speaker to the left built-in microphone minus propagation time from the right surround speaker to the right built-in microphone.

Item 5: According to the soundbar of items 1 to 4, the distance latencies of the center channel, the left surround channel, and the right surround channel may be calibrated based on the first distance, a second distance from the left surround speaker to the listening position, and a third distance from the right surround speaker to the listening position, respectively, and the left and right channels may be calibrated in a manner corresponding to the center channel.

Item 6: According to the soundbar of items 1 to 5, the second distance and the third distance are calculated by measuring left and right surround relative latencies using the center channel as a reference, respectively.

Item 7: According to the soundbar of items 1 to 6, the left surround relative latency is defined as propagation time from the left surround speaker to the left and right built-in microphones minus propagation time from the center channel to the left and right built-in microphones, and the right surround relative latency is defined as propagation time from the right surround speaker to the left and right built-in microphones minus the propagation time from the center channel to the left and right built-in microphones.

Item 8: According to the soundbar of items 1 to 7, the processor is further configured to align wireless transmission latencies by adding a buffer latency depending on performance of a system on chip to all channels of the surround sound system.

Item 9: According to the soundbar of items 1 to 8, compensating the magnitudes is based on the listening position.

Item 10: According to the soundbar of items 1 to 9, the automatic surround pairing and calibration may be one-click completed by the user pressing a button.

Item 11: In one or more embodiments, the disclosure provides a method for automatic surround pairing and calibration of a surround sound system, including the following steps of:

determining relative positions of left and right surround speakers;

obtaining, from a user, a listening position being at a first distance in front of a soundbar;

calibrating, by a processor, distance latencies of a center channel and left and a right surround channels; and compensating, in the left and right surround channels, magnitudes by merging with left and right filter compensating coefficients, respectively, where the left and right built-in microphones are integrated in the soundbar, fixed on both left and right sides near a center speaker.

Item 12: According to the method of item 11, the left and right surround channels may be automatically swapped with each other in software when the relative positions of the left and right surround speakers are determined to be incorrect.

Item 13: According to the method of items 11 to 12, the relative positions of the left and right surround speakers are determined to be incorrect when the differential time of sweep sound from the left surround speaker to the left and right built-in microphones is greater than that from the right surround speaker to the left and right built-in microphones.

Item 14: According to the method of items 11 to 13, the differential time of the sweep sound from the left surround speaker to the left and right built-in microphones is defined as propagation time of the sweep sound from the left surround speaker to left built-in microphone minus propagation time from the left surround speaker to right built-in microphone, and the differential time of the sweep sound from the right surround speaker to the left and right built-in microphones is defined as propagation time from the right surround speaker to the left built-in microphone minus propagation time from the right surround speaker to the right built-in microphone.

Item 15: According to the method of items 11 to 14, the distance latencies of the center channel, the left surround channel, and the right surround channel may be calibrated based on the first distance, a second distance from the left surround speaker to the listening position, and a third distance from the right surround speaker to the listening position, respectively, and the left and right channels may be calibrated in a manner corresponding to the center channel.

Item 16: According to the method of items 11 to 15, the second distance and the third distance are calculated by measuring left and right surround relative latencies using the center channel as a reference, respectively.

Item 17: According to the method of items 11 to 16, the left surround relative latency is defined as propagation time from the left surround speaker to the left and right built-in microphones minus propagation time from the center channel to the left and right built-in microphones, and the right surround relative latency is defined as the propagation time from the right surround speaker to the left and right built-in microphones minus the propagation time from the center channel to the left and right built-in microphones.

Item 18: According to the method of items 11 to 17, the method further includes aligning wireless transmission latencies by adding a buffer latency depending on performance of a system on chip to all channels of the surround sound system.

Item 19: According to the method of items 11 to 18, compensating the magnitudes is based on the listening position.

Item 20: According to the method of items 11 to 19, the steps included in the method may be one-click completed by a user by pressing a button.

item 21: In one or more embodiments, the disclosure provides a non-transitory computer-readable medium including instructions which, when executed by a processor, perform the following steps, including:

determining relative positions of left and right surround speakers;

obtaining, from a user, a listening position being at a first distance in front of a soundbar;

calibrating distance latencies of a center channel and left and right surround channels; and compensating, in the left and right surround channels, magnitudes by calculating and merging into left and right surround filter compensating coefficients, respectively, where the left and right built-in microphones are integrated in the soundbar, fixed on both sides near a center speaker.

Item 22: According to the non-transitory computer-readable medium of item 21, the left and right surround channels may be automatically swapped with each other in software when the relative positions of the left and right surround speakers are determined to be incorrect.

Item 23: According to the non-transitory computer-readable medium of items 21 to 22, the relative positions of the left and right surround speakers are determined to be incorrect when the differential time of sweep sound from the left surround speaker to the left and right built-in microphones is greater than that from the right surround speaker to the left and right built-in microphones.

Item 24: According to the non-transitory computer-readable medium of items 21 to 23, the differential time of the sweep sound from the left surround speaker to the left and right built-in microphones is defined as propagation time from the left surround speaker to the left built-in microphone minus propagation time from the left surround speaker to the right built-in microphone, and the differential time of the sweep sound from the right surround speaker to the left and right built-in microphones is defined as propagation time from the right surround speaker to the left built-in microphone minus propagation time from the right surround speaker to the right built-in microphone.

Item 25: According to the non-transitory computer-readable medium of items 21 to 24, the distance latencies of the center channel, the left surround channel, and the right surround channel are calibrated based on the first distance, a second distance from the left surround speaker to the listening position, and a third distance from the right surround speaker to the listening position, and the left and right channels may be calibrated in a manner corresponding to the center channel.

Item 26: According to the non-transitory computer-readable medium of items 21 to 25, the second distance and the third distance are calculated by measuring left and right surround relative latencies using the center channel as a reference, respectively.

Item 27: According to the non-transitory computer-readable medium of items 21 to 26, the left surround relative latency is defined as propagation time from the left surround speaker to the left and right built-in microphones minus the propagation time from the center channel to the left and right built-in microphones, and the right surround relative latency is defined as propagation time from the right surround speaker to the left and right built-in microphones minus the propagation time from the center channel to the left and right built-in microphones.

Item 28: According to the non-transitory computer-readable medium of items 21 to 27, the steps further include adjusting wireless transmission latencies by adding a buffer latency depending on performance of a system on chip to all channels of the surround sound system.

Item 29: According to the non-transitory computer-readable medium of items 21 to 28, compensating the magnitudes is based on the listening position.

Item 30: According to the non-transitory computer-readable medium of items 21 to 29, the steps may be one-click completed by a user by pressing a button.

While exemplary embodiments are described above, these embodiments are not intended to describe all possible forms of the disclosure. Rather, the words used in the specification are words of description rather than limitation, and it should be understood that various changes may be made without departing from the spirit and scope of the disclosure. In addition, the features of various embodiments may be combined to form further embodiments of the disclosure.

What is claimed is:

1. A soundbar for automatic surround pairing and calibration of a surround sound system, comprising:
   left and right built-in microphones for determining relative positions of left and right surround speakers;
   a processor configured to:
   obtain a listening position being at a first distance in front of the soundbar;
   calibrate distance latencies of a center channel and left and right surround channels; and
   calculate filter compensating coefficients and merge the calculated filter compensating coefficients into the left and right surround channels, respectively, for compensating magnitudes,
   wherein the left and right built-in microphones are integrated in the soundbar and respectively fixed on both left and right sides near a center speaker.

2. The soundbar of claim 1, wherein the processor is further configured to automatically swap the left and right surround channels with each other when the relative positions of the left and right surround speakers are determined to be incorrect.

3. The soundbar of claim 2, wherein the relative positions of the left and right surround speakers are determined to be incorrect when a differential time of a sweep sound from the left surround speaker to the left and right built-in microphones is greater than a different time of a sweep sound from the right surround speaker to the left and right built-in microphones.

4. The soundbar of claim 3, wherein the differential time of the sweep sound from the left surround speaker to the left and right built-in microphones is defined as propagation time of the sweep sound from the left surround speaker to the left built-in microphone being subtracted from a propagation time from the left surround speaker to the right built-in microphone, and wherein the differential time of the sweep sound from the right surround speaker to the left and right built-in microphones is defined as propagation time from the right surround speaker to the left built-in microphone being subtracted from a propagation time from the right surround speaker to the right built-in microphone.

5. The soundbar of claim 1, wherein the distance latencies of the center channel, the left surround channel, and the right surround channel are calibrated based on the first distance, a second distance from the left surround speaker to the listening position, and a third distance from the right surround speaker to the listening position, respectively, and the left and right channels are calibrated based on the center channel.

6. The soundbar of claim 5, wherein the second distance and the third distance are calculated by measuring left and right surround relative latencies, respectively, using the center channel as a reference.

7. The soundbar of claim 6, wherein the left surround relative latency is defined as a propagation time from the left surround speaker to the left and right built-in microphones being subtracted from a propagation time from the center channel to the left and right built-in microphones, and the right surround relative latency is defined as a propagation time from the right surround speaker to the left and right built-in microphones being subtracted from a propagation time from the center channel to the left and right built-in microphones.

8. The soundbar of claim 1, wherein the processor is further configured to align wireless transmission latencies by adding a buffer latency depending on performance of a system on chip (SoC) to all channels of the surround sound system.

9. The soundbar of claim 1, wherein compensating the magnitudes is based on the listening position.

10. The soundbar of claim 1, wherein the automatic surround pairing and calibration is one-click operation that is performed in response to a button being depressed.

11. A method for automatic surround pairing and calibration of a surround sound system, the method comprising:
    determining, via left and right built-in microphones, relative positions of left and right surround speakers;

obtaining a listening position being at a first distance in front of a soundbar;
calibrating, by a processor, distance latencies of a center channel and left and right surround channels; and
compensating, in the left and right surround channels, magnitudes by merging left and right filter compensating coefficients, respectively,
wherein the left and right built-in microphones are integrated in the soundbar and respectively fixed on both left and right sides, near a center speaker.

12. The method of claim 11, wherein the left and right surround channels are automatically swapped with each other when the relative positions of the left and right surround speakers are incorrect.

13. The method of claim 12, wherein the relative positions of the left and right surround speakers are determined to be incorrect when a differential time of sweep sound from the left surround speaker to the left and right built-in microphones is greater than a differential time of sweep sound from the right surround speaker to the left and right built-in microphones.

14. The method of claim 13, wherein the differential time of the sweep sound from the left surround speaker to the left and right built-in microphones is defined as propagation time from the left surround speaker to left built-in microphone being subtracted from a propagation time from the left surround speaker to the right built-in microphone, and wherein the differential time of the sweep sound from the right surround speaker to the left and right built-in microphones is defined as propagation time from the right surround speaker to the left built-in microphone being subtracted from a propagation time from the right surround speaker to the right built-in microphone.

15. The method of claim 11, wherein the distance latencies of the center channel, the left surround channel, and the right surround channel are calibrated based on the first distance, a second distance from the left surround speaker to the listening position, and a third distance from the right surround speaker to the listening position, respectively, and the left and right channels are calibrated based on the center channel.

16. The method of claim 15, wherein the second distance and the third distance are calculated by measuring left and right surround relative latencies, respectively, using the center channel as a reference.

17. The method of claim 16, wherein the left surround relative latency is defined as propagation time from the left surround speaker to the left and right built-in microphones being subtracted from a propagation time from the center channel to the left and right built-in microphones, and the right surround relative latency is defined as propagation time from the right surround speaker to the left and right built-in microphones being subtracted from a propagation time from the center channel to the left and right built-in microphones.

18. The method of claim 11, wherein the method further comprises adjusting wireless transmission latencies by adding a buffer latency based on performance of a system on chip (SoC) to all channels of the surround sound system.

19. The method of claim 11, wherein compensating the magnitudes is based on the listening position.

20. The method of claim 11, wherein the steps comprised in the method are performed as a one-click operation in response to a user activation.

21. A non-transitory computer-readable medium including instructions which, when executed by a processor, perform the following steps comprising:

determining, via left and right built-in microphones, relative positions of left and right surround speakers;
obtaining a listening position being at a first distance in front of a soundbar;
calibrating, by the processor, distance latencies of a center channel and left and right surround channels; and
compensating, in the left and right surround channels, magnitudes by calculating and merging into left and right surround filter compensating coefficients, respectively,
wherein the left and right built-in microphones are integrated in the soundbar and respectively fixed on both left and right sides near a center speaker.

22. The non-transitory computer-readable medium of claim 21, wherein the left and right surround channels may be automatically swapped with each other when the relative positions of the left and right surround speakers are determined to be incorrect.

23. The non-transitory computer-readable medium of claim 22, wherein the relative positions of the left and right surround speakers are determined to be incorrect when a differential time of sweep sound from the left surround speaker to the left and right built-in microphones is greater than a differential time of sweep from the right surround speaker to the left and right built-in microphones.

24. The non-transitory computer-readable medium of claim 23, wherein the differential time of the sweep sound from the left surround speaker to the left and right built-in microphones is defined as propagation time from the left surround speaker to the left built-in microphone being subtracted from a propagation time from the left surround speaker to the right built-in microphone, and wherein the differential time of the sweep sound from the right surround speaker to the left and right built-in microphones is defined as propagation time from the right surround speaker to the left built-in microphone being subtracted from a propagation time from the right surround speaker to the right built-in microphone.

25. The non-transitory computer-readable medium of claim 21, wherein the distance latencies of the center channel, the left surround channel, and the right surround channel are calibrated based on the first distance, a second distance from the left surround speaker to the listening position, and a third distance from the right surround speaker to the listening position, and the left and right channels is calibrated in a manner corresponding to the center channel.

26. The non-transitory computer-readable medium of claim 25, wherein the second distance and the third distance are calculated by measuring left and right surround relative latencies, respectively, based on the center channel as a reference.

27. The non-transitory computer-readable medium of claim 26, wherein the left surround relative latency is defined as propagation time from the left surround speaker to the left and right built-in microphones being subtracted from a propagation time from the center channel to the left and right built-in microphones, and the right surround relative latency is defined as propagation time from the right surround speaker to the left and right built-in microphones being subtracted from a propagation time from the center channel to the left and right built-in microphones.

28. The non-transitory computer-readable medium of claim 21 further comprising adjusting wireless transmission latencies by adding a buffer latency depending on performance of a system on chip (SoC) to all channels of a surround sound system.

29. The non-transitory computer-readable medium of claim 21, wherein compensating the magnitudes is based on the listening position.

30. The non-transitory computer-readable medium of claim 21, wherein the steps are performed as a one-click operation in response to a user activation.

* * * * *